April 6, 1948. T. P. KEITHLEY ET AL 2,439,007
TWO-WAY CATTLE AND HOG FEEDER
Filed Nov. 15, 1945 2 Sheets-Sheet 1

INVENTOR.
T. P. KEITHLEY
LESLIE O. CHANDLER
BY Victor J. Evans & Co.
ATTORNEYS

April 6, 1948.  T. P. KEITHLEY ET AL  2,439,007
TWO-WAY CATTLE AND HOG FEEDER
Filed Nov. 15, 1945  2 Sheets-Sheet 2
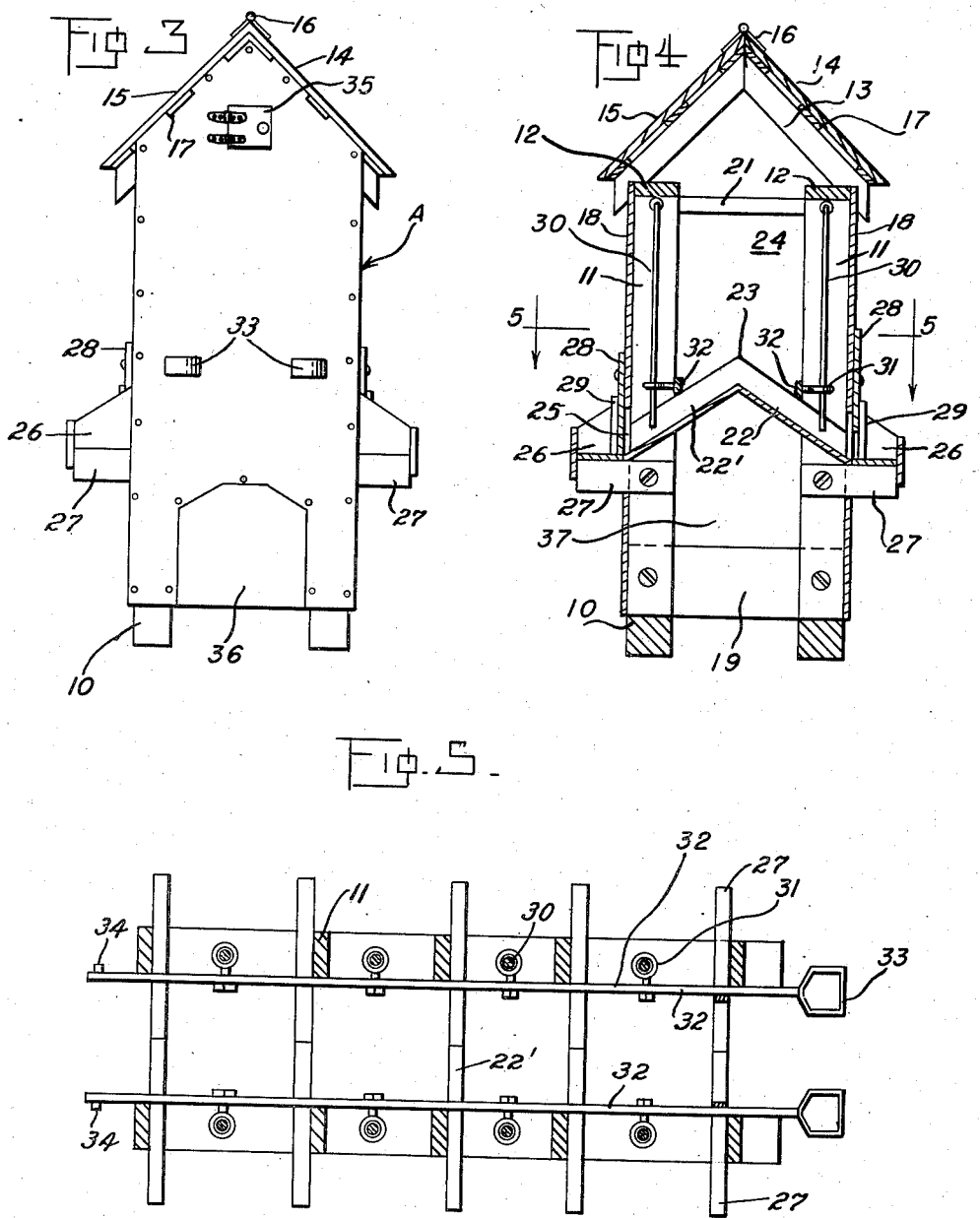
INVENTOR.
T. P. KEITHLEY
LESLIE O. CHANDLER
BY Victor J. Evans & Co.
ATTORNEYS Patented Apr. 6, 1948

2,439,007

UNITED STATES PATENT OFFICE 2,439,007

TWO-WAY CATTLE AND HOG FEEDER

Tim P. Keithley and Leslie O. Chandler, Middletown, Mo.; said Keithley assignor to said Chandler Application November 15, 1945, Serial No. 628,760

2 Claims. (Cl. 119—53)

The invention relates to a stock feeder, and more especially to double trough cattle and hog feeding device.

The primary object of the invention is the provision of a device of this character, wherein hogs or cattle can be continuously supplied with feed and the feeding can be had from either side of such device, the latter being of novel construction and is unique in the arrangement of the same.

Another object of the invention is the provision of a device of this character, wherein a large quantity of feed can be stored therein so that it will serve as a self feeder for cattle or hogs, other animals and poultry, there being no liability of the choking of the device, as an agitator is built therewith, and is hand operated.

A further object of the invention is the provision of a device of this character which is simple in construction, thoroughly reliable and efficient in the working thereof, strong, durable, portable, eliminates scattering of the feed with resultant waste thereof, thoroughly sanitary, weatherproof, and inexpensive to manufacture and install.

With these and other objects in view, the invention consists in the features of construction, combination and arrangement of parts as will be hereinafter set forth in detail, illustrated in the accompanying drawings, which show the preferred embodiment of the invention and pointed out in the claims hereunto appended.

In the accompanying drawings:

Figure 3 is an end view;

Figure 4 is a sectional view taken on the line 4—4 of Figure 1 looking in the direction of the arrows;

Figure 5 is a horizontal sectional view taken on the line 5—5 of Figure 4 looking in the direction of the arrows but with the external walling and flooring removed disclosing only the internal framework.

Similar reference characters indicate corresponding parts throughout the several views in the drawings.

Figure 1:
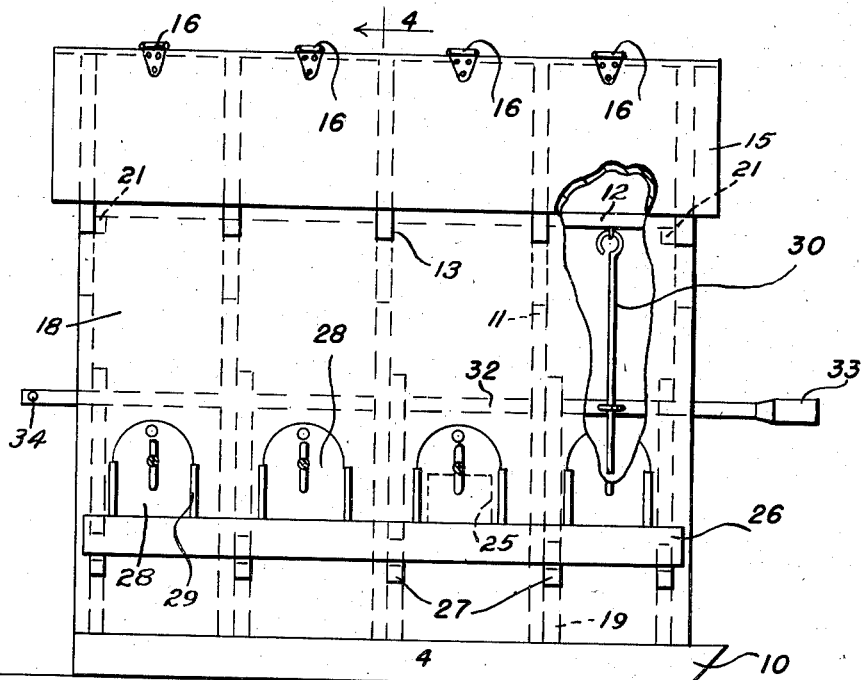
Figure 1 is a side view of the device, partly broken away, constructed in accordance with the invention.
Figure 2:
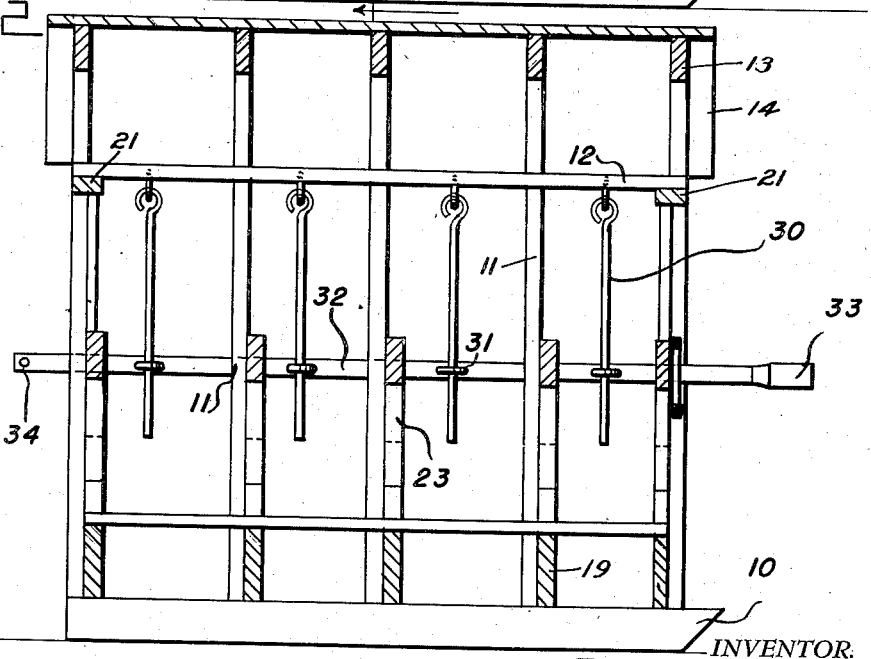
Figure 2 is a vertical, longitudinal, central sectional view through the device.

Referring to the drawings in detail, the device constituting the present invention comprises a body structure designated generally at A, to form a receptacle which involves a frame set-up including spaced parallel base or bottom sills 10 disposed longitudinally of the receptacle, and from which rise spaced vertically disposed wall studdings 11 capped by top or rafter sills 12, the studdings 11 being united and fitted to the sills 10 and 12, respectively, in any suitable manner.

Bridging the rafter sills 12 are the roof rafters 13, these presenting a longitudinal center peak to the roof, which involves stationary and vertically swingable roof sections 14 and 15, respectively. The swingable section 15 constitutes an entrance closure to the receptacle and is connected by hinges 16 to the stationary section 14, as best seen in Figure 1 of the drawings. The sections 14 and 15 are supplemented by roof slats 17 carried by the same and those slats 17 common to the section 14 are fixed to the rafters 12.

The studdings 11 support the external walling 18 for the receptacle, which is closed at the sides and ends thereof, excepting as hereinafter set forth. The studdings 11 have joined thereto cross struts 19 next to the base sills 10, while the capping sills 12 at the ends of the receptacle have joined thereto cross struts 21, thus in this manner the frame set-up is rigid to withstand the load of feed when within the receptacle, the latter being filled at the roof area, on opening the closure section 15 thereto.

Within the frame set-up and elevated above the base sills 10 is an inverted substantially V-shaped flooring 22 supported by floor joist 22', and this flooring reversely slopes from its central longitudinal apex 23 to opposite sides of the receptacle, which above this flooring creates a feed storage compartment 24, and in this manner the feed gravitates in two directions through doorways 25, only one of which is shown in Figure 1, leading to feeding troughs 26 horizontally supported exteriorly of the receptacle upon rests 27 suitably secured to the studding 11 and projecting laterally from the sides outwardly thereof, as will appear from Figures 3 and 4 of the drawings. These doorways 25 are regulated with respect to their opening range by closure slides 28, which individually are manually raised and lowered, each being fitted in guide cleats 29.

Loosely hung from the capping sills 12 in confronting relation to the doorways 25 are depending agitator rods 30, which have loose ring coupling connections 31 with actuator bars 32, which are shiftably supported in the frame set-up, and each at one end is formed with a handle 33 exposed beyond one end of the receptacle for manual control. These rods when operated, loosen the feed to prevent clogging for the supply thereof to the troughs where the feed is to be consumed by cattle or hogs or other animals or fowl. Each bar 32 is prevented from being pulled out of the frame set-up by an anchoring pin 34 located at the end remote from the handle 33.

One end of the receptacle carries doors 35 and 36, which gives access, respectively, to the compartment 24 and the space 37 beneath the flooring 22. The door 35 permits the throwing in of small quantities of scraps of food without lifting the roof section 15. The door 36 is merely for inspection purposes.

What is claimed is:

1. A feeder of the kind described, comprising a receptacle having longitudinally extending rafter sills, an inverted substantially V-shaped flooring within the receptacle and effecting a feed compartment to the receptacle above such flooring, feed troughs exteriorly of the receptacle at opposite sides thereof and having communication with the compartment, closure slides controlling the communications to the troughs, loosely hung agitator rods depending from said sills within the compartment and confronting the communications, and manually operated bars having connection with the rods for agitating the same.

2. A feeder of the kind described, comprising a receptacle having longitudinally extending rafter sills, an inverted substantially V-shaped flooring within the receptacle and effecting a feed compartment to the receptacle above such flooring, feed troughs exteriorly of the receptacle at opposite sides thereof, doorways in the receptacle connecting said troughs with the compartment, closure slides for said doorways controlling the flow of feed from the compartment to the troughs, loosely hung agitator rods depending from said sills within the compartment and adjacent the doorways, manually operated bars, means connecting the same with the rods for agitating the same, and a roofing above said sills and on the receptacle and having an entrance section thereto.

TIM P. KEITHLEY.
LESLIE O. CHANDLER.

REFERENCES CITED

The following references are of record in the file of this patent:

UNITED STATES PATENTS

| Number | Name | Date |
|---|---|---|
| 2,362,078 | Lee | Nov. 7, 1944 |